(12) United States Patent
Eden et al.

(10) Patent No.: US 9,183,197 B2
(45) Date of Patent: Nov. 10, 2015

(54) LANGUAGE PROCESSING RESOURCES FOR AUTOMATED MOBILE LANGUAGE TRANSLATION

(71) Applicant: Microsoft Corporation, Redmond, WA (US)

(72) Inventors: Ibrahim Eden, Kirkland, WA (US); Christopher Quirk, Seattle, WA (US); Anthony Aue, Seattle, WA (US); Michel Galley, Bellevue, WA (US); Frederik Schaffalitzky, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 222 days.

(21) Appl. No.: 13/715,320

(22) Filed: Dec. 14, 2012

(65) Prior Publication Data

US 2014/0172407 A1 Jun. 19, 2014

(51) Int. Cl.
*G06F 17/28* (2006.01)

(52) U.S. Cl.
CPC .................................. *G06F 17/2809* (2013.01)

(58) Field of Classification Search
CPC .................................................. G06F 17/2809
USPC ............................................................ 704/2
See application file for complete search history.

(56) References Cited

U.S. PATENT DOCUMENTS

| | | | |
|---|---|---|---|
| 6,233,545 B1 * | 5/2001 | Datig | 704/2 |
| 6,473,729 B1 | 10/2002 | Gastaldo et al. | |
| 6,502,064 B1 | 12/2002 | Miyahira et al. | |
| 7,869,989 B1 * | 1/2011 | Harvey et al. | 704/9 |
| 7,983,898 B2 | 7/2011 | Moore | |
| 8,108,207 B1 * | 1/2012 | Harvey et al. | 704/9 |
| 8,150,677 B2 | 4/2012 | Menezes | |
| 8,548,791 B2 * | 10/2013 | Itagaki et al. | 704/2 |
| 8,788,258 B1 * | 7/2014 | Bangalore et al. | 704/4 |

(Continued)

OTHER PUBLICATIONS

Zhou, Bowen, "An Overview of IBM Speech-to-Speech Translation (S2S)"—Published Date: Dec. 1, 2009, pp. 29 http://www.ee.columbia.edu/~stanchen/fall09/e6870/slides/lecture12_s2s.pdf.

(Continued)

*Primary Examiner* — Susan McFadden
(74) *Attorney, Agent, or Firm* — Steven Spellman; Danielle Johnston-Holmes; Micky Minhas

(57) ABSTRACT

Automated language translation often involves language translation resources of significant size (e.g., 50-gigabyte phrase tables) and significant computational power exceeding the capabilities of many mobile devices. Remotely accessible servers capable of near-realtime, automated translation may be inaccessible or prohibitively costly while traveling abroad. Presented herein are adaptations of language translation techniques for offline mobile devices involving reducing the size and raising the efficiency of the language modeling resources. A word index may be provided that stores respective string representations of the words of a language, and maps respective words to a location (e.g., address or offset) of respective word representations within the word index. Language translation resources (e.g., phrase tables) may then specify logical relationships using the word index addresses of the involved words, rather than the string equivalents. This technique significantly condenses the language resources and provides faster, bidirectional access to the word representations of the language.

20 Claims, 8 Drawing Sheets

(56) References Cited

U.S. PATENT DOCUMENTS

2004/0102956 A1 5/2004 Levin
2008/0177528 A1 7/2008 Drewes
2009/0248422 A1 10/2009 Li
2010/0299132 A1 11/2010 Dolan
2011/0320185 A1 12/2011 Broshi
2012/0035908 A1 2/2012 Lebeau

OTHER PUBLICATIONS

"Helping Save Languages by Teaching Machines to Speak"—Published Date: Jul. 11, 2012, pp. 4, http://www.microsoft.com/en-us/news/features/2012/jul12/07-11Translator.aspx.

* cited by examiner

LANGUAGE PROCESSING RESOURCES FOR AUTOMATED MOBILE LANGUAGE TRANSLATION

BACKGROUND

Within the field of computing, many scenarios involve automated language translation between input provided in a source language and output provided in a target language. Such techniques may not only include automated translation from a source natural language to a target natural language, but also between a first modality and a second modality of the same language (e.g., spoken and written words), and between two domains within the same language (e.g., describing a topic in technical language and in non-technical language).

Many types of language translation techniques may be applied to such scenarios. For example, for a request to translate a word sequence in a source language into a target language, a device may utilize a phrase table to map various phrases in the source language to equivalent phrases in the target language (e.g., using an English-to-French word reference identifying corresponding pairs or sets of words in each language). Additionally, the device may apply a language model that is capable of identifying, among two or more candidate selections and orderings of words in the target language, the candidate that is likely to be the most accurate and/or fluent translation of the word sequence in the source language. Such architectures may utilize a wide variety of techniques to perform the phrase selection and/or language modeling in order to provide automated translation techniques presenting an acceptable accuracy and/or fluency.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While many types of translation techniques may be utilized in order to provide automated language translation, it may be appreciated that many such techniques are computationally intensive. In particular, the amount of data that is indexed for and accessed by such language translation techniques may be voluminous (e.g., phrase tables may approach fifty gigabytes), and applying complex analysis to the phrase table and/or language model may involve considerable memory consumption and processing power for cross-referencing and random access. Such models are typically feasible for computing devices with plentiful resources, such as computationally robust servers, but implementing such techniques on portable devices may be difficult due to resource constraints. Accordingly, many portable devices provide language translation by utilizing a remote server, e.g., sending the language portion for translation to the remote server over a wireless network and receiving back the translation. However, scenarios where language translation is often utilized also frequently involve high fees for mobile communication services, such as high roaming charges while using a mobile phone in a foreign country. Thus, while remote devices may provide plentiful connectivity to remote services while used in a home region, the accessibility of such services on an on-demand basis while traveling abroad may be limited or not feasible.

Provided herein are architectures for enabling the implementation of language translation techniques on mobile devices that do not involve on-demand, just-in-time communication with a translation server. In accordance with these considerations, mobile translation on a device may involve techniques for reducing the amount of data involved in translation resources, e.g., by reconfiguring the phrase table and/or language model to refer to the words of the source language and/or target language in a condensed manner. In particular, if respective words of a phrase in the source and/or target language are replaced with identifiers such as 32-bit integers, the phrase table and language model may be considerably reduced in size. Additionally, the logic specified thereby may be more efficiently executed if the data is presented as a comparison among integer arrays rather than more lengthy character strings (particularly where such character strings may involve typographical errors and homonyms). This result may be achieved by providing a word index for one or both languages, where the word maps respective character-based words of the source language as a number, such as an integer. While this technique marginally increases the computational burden by adding this mapping technique to the translation process, the application of the logic specified by the word index as numbers rather than a character string may alleviate or outweigh this computational burden. Additionally, it may be possible to use one word index both to translate words to index-based integers and vice versa, e.g., by specifying in the word index, for selective integers, the location of the string representation of the word in the word index (e.g., an offset from the start of the file, or from a particular location in the file). Thus, the same file may be used to identify the integer representation of the word from the string representation of the word, and may also, even more efficiently, identify the string representation of the word from the integer representation of the word (simply by seeking to the file position within the file and reading the string). This access technique be may particularly advantageous on devices having a limited amount of system memory and a larger but slower storage, because the language translation resources may be efficiently read directly from storage rather than being loaded into system memory. These and other features may provide various advantages in the configuration of a mobile device to perform offline translation in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
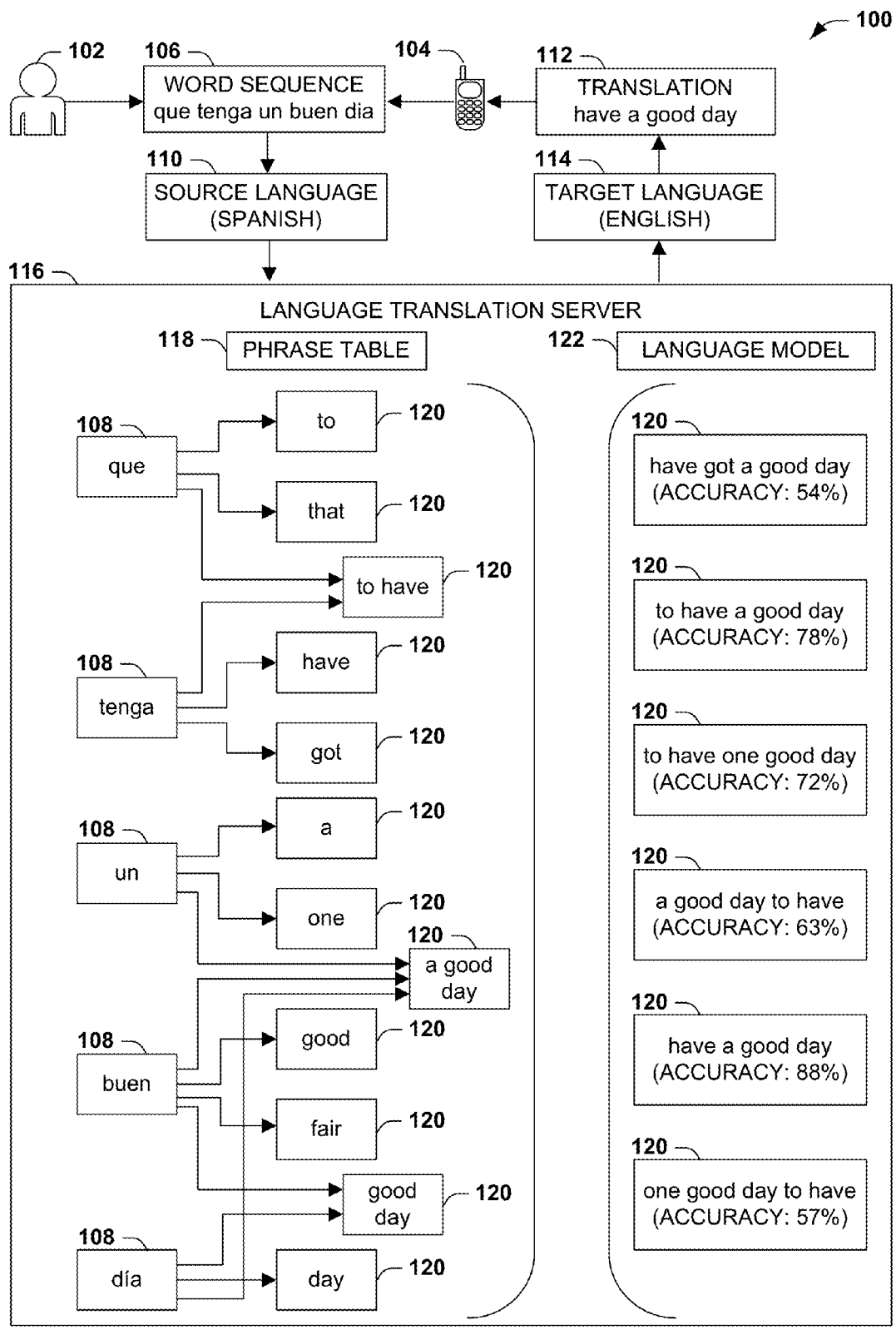
FIG. 1 is an illustration of an exemplary scenario featuring a server-provided language translation utilizing a set of language translation resources.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve automated translation of input from a first language into a second language for presentation to a user. Such translation techniques may include, e.g., translation from a first native language of the user into a second natural language; translation from a first modality of a language to a second modality of the same or a different language (e.g., translating spoken text to written text); and translation from a first domain of a language into a second domain (e.g., a conversion of a text from a technical presentation of information to a colloquial presentation of information). Many techniques have been devised for partially or wholly automating such translation, where various techniques may present comparative advantages with respect to translating to or from particular types of languages; various translation features, such as accuracy, fluency, and speed; and various scenarios wherein such techniques may be implemented.

Many such techniques utilize a translation model that provides logic for translating input from a first language into a second language. For example, a device may store a phrase table that specifies phrases in a target language that are equivalent to an input phrase in a source language. The phrase table may also provide many possible variations in a phrase, and the phrases of a passage in the source language may be arranged in many ways to suit the features of the target language, such as reordering the words to suit the characteristics and customs of the language. Accordingly, a language model may be provided that assists in selecting among and ordering the phrases identified by the phrase table in order to provide a translation resembling a native expression of the input in the second language. However, the language translation resources often provide an extensive set of translations, e.g., in order to cover a wide range of the translations of a phrase that may suit different scenarios and cover variations in meaning. For example, a phrase table that provides translations of single words between a source language and a target language may be comparatively small (e.g., providing one or more translations 10,000 source language words), but a bigram language model, providing one or more translations of each valid two-word sequence in the source language and possible translations, may cover 100 million two-word sequences, and trigram or longer n-gram language models may involve even larger amounts of data. Accordingly, the phrase table and/or language model may grow to sizes of 50 gigabytes or more in order to provide accurate translations, and may involve significant amounts of computational power to consider, concurrently, a large number of possible variations among candidate translations of a word sequence. Accordingly, the resources are often provided on high-capacity computational units, such as powerful servers with plentiful storage and computational capacity, in order to provide automated, near-realtime translation with acceptable accuracy.

FIG. 1 presents an illustration of an exemplary scenario 100 featuring a user 102 of a device 104 providing a word sequence 106 in a source language 110 (e.g., in the Spanish language) and requesting the device 104 to provide a translation 112 in a target language 114 (e.g., in the English language). In this exemplary scenario 100, the device 104 sends the word sequence 106 to a language translation server 116 for translation. The language translation server 116 evaluates respective words 108 of the word sequence 106, and, using the phrase table 118, identifies one or more candidate translations 120 corresponding to the word 108, optionally identifying a prediction of the accuracy and fluency of the candidate translation 120. Combinations of words 108 may also be evaluated using the phrase table 118; e.g., identifying "un," "buen," and "dia" independently may result in the one-word translations "one," "fair," and "day," but evaluating the word sequence "un buen dia" may yield the more likely phrase "a good day." The language translation server 116 may then evaluate the candidate translations 120 using a language model 122 (often evaluated together with the logic specified by the phrase table 118) to choose the translation 112 having the highest match with the source language 116 (e.g., having a highly predicted fluency in the target language according to the target language model). In this manner, the language translation server 116 may automatically provide the translation 112 to the device 104 for presentation to the user 102.

B. Presented Techniques

While the exemplary scenario 100 of FIG. 1 provides an exemplary technique for configuring a language translation server 116 having plentiful computing resources to generate and provide the translation 112 to the user 102 of the device 104, which may be accessed over a wired or wireless network while the user 102 is traveling. However, in many such scenarios, the connectivity of the device 104 while traveling may be unavailable, or may be prohibitively expensive due to roaming charges. Such connectivity limitations may restrict the reliance of the device 104 on a remote server for translation services, which is exacerbated by the high likelihood of demand for such services while traveling.

In view of these circumstances, it may be advantageous to provide language translation services that may be performed by the device 104 while not connected to a server. That is, while the device 104 may communicate with a server to receive language translation resources for later use, it may be desirable to enable the device 104 to use such resources in a disconnected manner. It may be appreciated that the limiting characteristics of such resources (particularly, the typical size and usage patterns) that complicate implementation on the device 104 may be resolvable.

Presented herein are techniques for generating and providing language translation resources that may be suitable for devices 104 having limited connectivity and/or limited computational resources, such as processor capacity and memory capacity (and in particular, devices 104 operating in a disconnected manner). Such techniques may also provide other general features, such as efficiency and flexibility, that may be advantageous for many types of devices 104 and scenarios. In particular, a phrase table 108 and/or language model 122 sometimes specify the words 108 and candidate translations 120 as comparisons between strings, but due to the large amount of data provided in these resources and comparisons involved, encoding string representations for direct comparison may be inefficient. Alternatively, respective words may be associated with arbitrarily selected identifiers that are more compact and easier to compare, such as an integer representing a hashcode of a string representation of a word 108. However, using hashcodes may be disadvantageous due to the one-way nature of the computation (e.g., it may be difficult to identify the particular word 108 from a hashcode value) and the lack of uniqueness among such hashcodes (e.g., hashing collisions may cause two or more words 108 to map to the same hashcode). Thus, it may be advantageous to choose an identifier for the respective words 108 of a language that is not only compact and subject to efficient comparisons, but also reversible and/or unique.

Figure 2:
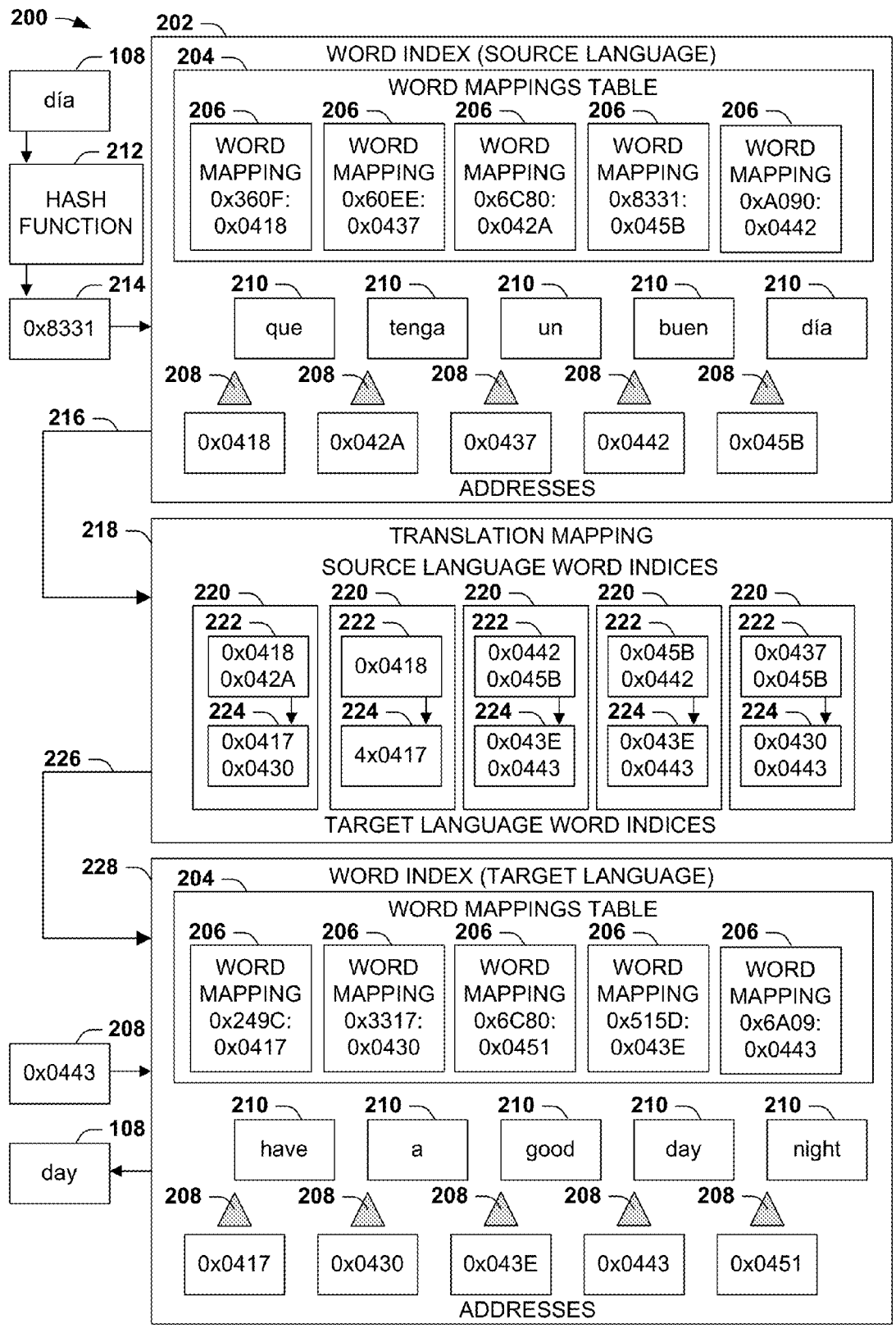
FIG. 2 is an illustration of an exemplary scenario featuring an adjustment of language translation techniques and resources adapted for offline use on mobile devices in accordance with the techniques presented herein.

FIG. 2 presents an illustration of an exemplary scenario 200 featuring a set of language translation resources that may be usable to provide automated language translation on a device 104 with limited connectivity and/or computational resources, such as a mobile phone or tablet. In this exemplary scenario, in addition to a translation mapping 218 that enables translation from a word 108 in a source language 110 to a translation 112 in a target language 114 (such as a phrase table 118 or language model 122), the device 104 may include at least one word index 202 storing a set of string representations 210 of the words 108 at respective index locations 208 within the word index 202. Additionally, the word index 202 may include a word mappings table 204 comprising a set of word mappings 206 that enable an identification of the index location 208 of a string representation 210 of a word 108 in the word index 202. For example, the device 104 may include a word mapping function for which a word mapping value may be identified for respective words 108, such as a hash function 212, which may be applied to respective words 108 to identify a hash value 214 for the string representation 210 of a word 108. The source word index 202 may store a hashtable associating the hash value 214 for respective words 108 of the source language 110 with the index location 208 of the string representation 210 of the word 108. Using the hash function 212 and the word mappings table 204, the device 104 may identify the index location 208 for the word 108, where the index location 208 is used to represent the word 108 in the translation mappings 218. Additionally, a target word index 228 may encode string representations 210 of the words 108 of the target language 114 at particular index locations 208 within the target word index 228, and these index locations 208 may be used as condensed identifiers of the words 108. The translation mapping 218 may therefore specify the translation logic as a set of associations 220 between a word index sequence 222 of index locations 208 in the source word index 202 and at least one index location 208 respectively representing a word 108 of the translation 112 of the word index sequence 222; i.e., the translated words 224 may be similarly identified in the translation mapping 218 as string representations 210 stored at target index locations 208 within the target word index 228. Additionally, the target word index 228 may also provide a word mappings table 204 that may be used to convert words 108 of the target language 114 into a translation 112 in the source language.

A device 104 may utilize the resources illustrated in the exemplary scenario 200 of FIG. 2 in the following manner. A user 102 may provide a word sequence 106 in a source language 110 including at least one word 108, and may request a translation 112 in a target language 114. The device 104 may apply a word mapping function (such as a hash function 212) to compute a word mapping value (such as a hash value 214), which may be compared with the word mappings 206 of the word mappings table 204 to identify the index location 208 of a string representation 210 of the word 108. The device 104 may access 216 the logic of the translation mapping 218 using the index locations 208 of the words 108 of the source language 110, resulting in a set of translated words 224 in the target language 114. The translated words 224 are also specified in the translation mapping 218 as target language indices 208, which the device 104 may use to index into the target word index 228 to retrieve the string representations 210 of the words 108 in the target language 114. In this manner, the device 104 may use the translation resources represented in the exemplary scenario 200 of FIG. 2 to generate an automated translation 112 of the word sequence 106 in the source language 110 to the target language 114. Additionally, if translation from the target language 114 to the source language 110 is desired, the word mappings table 204 included in the target word index 228 may be used to perform this translation in the other direction.

Some embodiments utilizing the generation and use of the resources presented in this exemplary scenario 200 may provide one or more advantages as compared with other techniques. As a first example, the resources may present a smaller size than other techniques, due to the use of the index locations 208 to identify the words 108 of the languages in the translation mappings 218 rather than string representations 210 or other representations with a large size. For example, in scenarios featuring a comparatively small set of words 108 with comparatively short string representations 210, respective words 108 may be identifiable with only a two-byte integer (optionally identifying a boundary on which the words 108 are aligned within the language translation resource, e.g., aligning the words 108 at four-byte address boundaries and dividing the address of a string representation 210 by four to generate the index location 208 representing the word 108). Thus, the inclusion of the word index 202 may marginally increase the total data size of the language resource set, but generating the translation mappings 218 using the word index 202 may very significantly reduce the size of the language resource set. Although advantageous in many contexts, such significant reduction in data size may enable the inclusion of the language mapping resources on portable devices for offline language translation.

As a second exemplary advantage, the resources may be reusable. For example, a word mappings table 204 may be usable both to convert words 108 of a language to index locations 208 of string representations 210 within the word index 202 (usable for converting the words 108 from the language to a second language), and to convert index locations 208 into the string representations 210 of the words 108 of the language (usable for converting the words 108 from a second language to the language). If two word indices 202 are provided for two languages, each comprising a word mappings table 204, along with a bidirectional translation mapping 218, then translation may be provided from either language to the other language. Moreover, providing a word index 202 for each of several language may enable the reuse of the word index 202 both for converting from the language to any other language, and also for converting from any other language to the language.

As a third exemplary advantage, the use of the language translation resources may be efficiently accessed, which may be advantageous for devices with limited computational resources. As a first example, representing the words 108 in the translation mapping 218 by the index locations 208 of the string representations 210 in the word index enables a rapid lookup (i.e., simply seek to the specified address and read the string representation 210 at that address). Moreover, direct access into the binary representation of the word index 202 may be performed in storage, rather than having to load the word index 202 into active memory (which may be more limited) to access the word 108. As a second example, specifying the logic of the translation mapping 218 may include comparisons among representations of words 108, and using index locations 208 specified as integers may provide efficient logical evaluation as compared with comparisons of string representations 210 of the same words 108. As a third example, using the index locations 208 avoids the complexities involved in collisions involving two or more words 108 having the same identifier. That is, while the hash function 212 may result in collisions between respective words 108, these collisions may be resolved in the word mappings table 204 (e.g., as a bucket-based hashtable) to identify unique index locations 208 for respective words 108, which may be more efficient than specifying the logic of the translation resources with representations of respective words 108 according to the hash value 214 of the word 108, which may be susceptible to collisions. These and other advantages may be achievable through the generation and use of the mapping resources according to the techniques presented herein.

C. Exemplary Embodiments

The techniques presented herein may be included in many types of embodiments.

Figure 3:
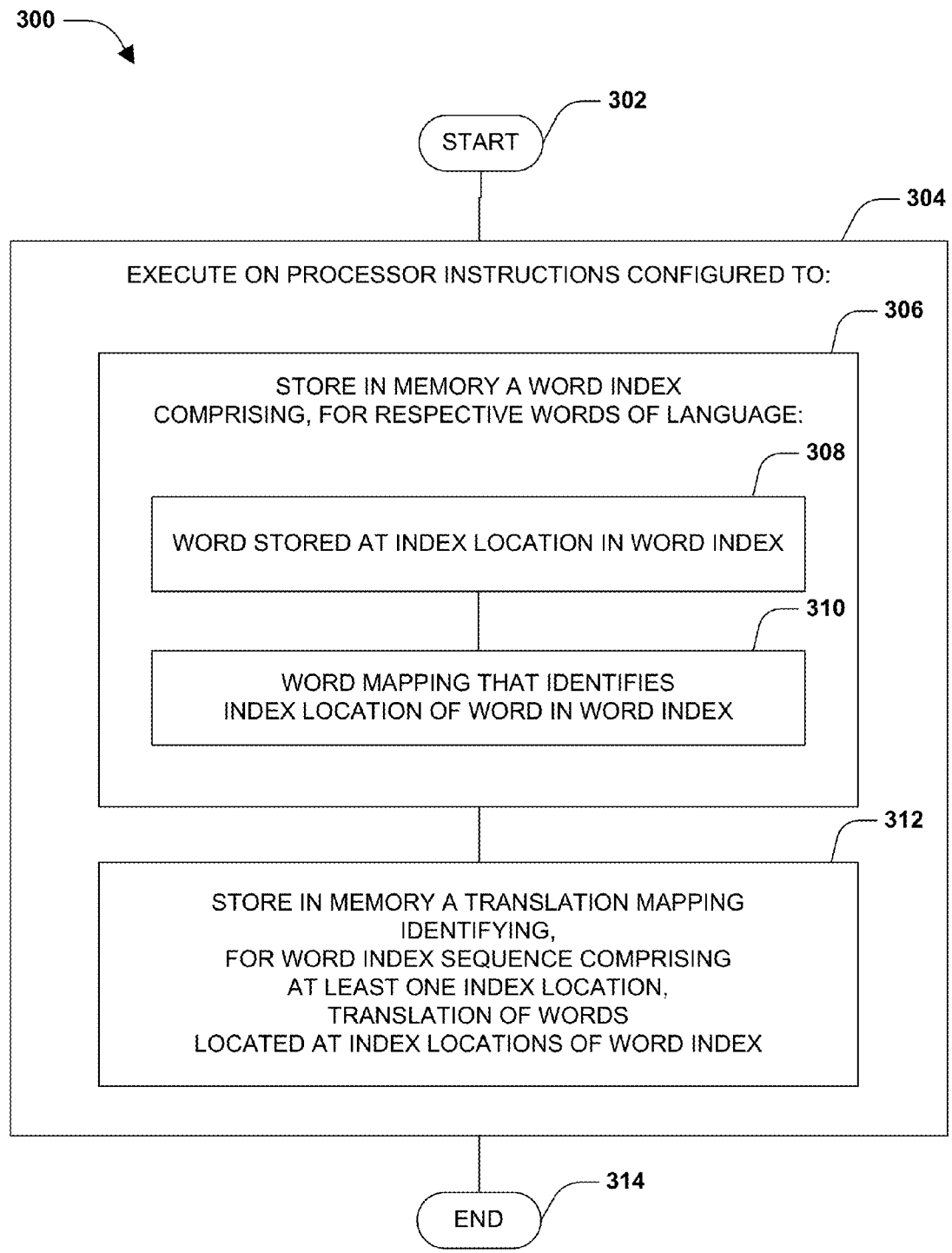
FIG. 3 is an illustration of a flow diagram depicting an exemplary method of configuring a device to generate and store language translation resources that may later be used for automated language translation in accordance with the techniques presented herein.

FIG. 3 presents a first exemplary embodiment of the techniques provided herein, illustrated as an exemplary method 300 of representing a language comprising at least two words 108 and at least one translation 112 of a word sequence. The exemplary method 300 may be implemented, e.g., as a set of instructions stored in a memory component of the device (e.g., a memory circuit, a platter of a hard disk drive, a solid-state storage device, or a magnetic or optical disc) that, when executed on a processor of the device, cause the device to represent the language in the memory according to the techniques presented herein. The exemplary method 300 begins at 302 and involves executing 304 the instructions on the processor. More particularly, the instructions are configured to store 306 in the memory a word index 202 comprising, for respective words 108 of the language, the word 308 stored at an index location 208 in the word index 202, and a word mapping 310 that identifies the index location 208 of the word 108 in the word index 202. The instructions are also configured to store 312 in the memory a translation mapping 220 identifying, for a word index sequence 222 comprising at least one index location 208, the translation 112 of the words 108 located at the index locations 208 of the word index 202. In this manner, the exemplary method 300 may generate the language resources as a representation of a language for use in automated language translation techniques, and so ends at 314.

Figure 4:
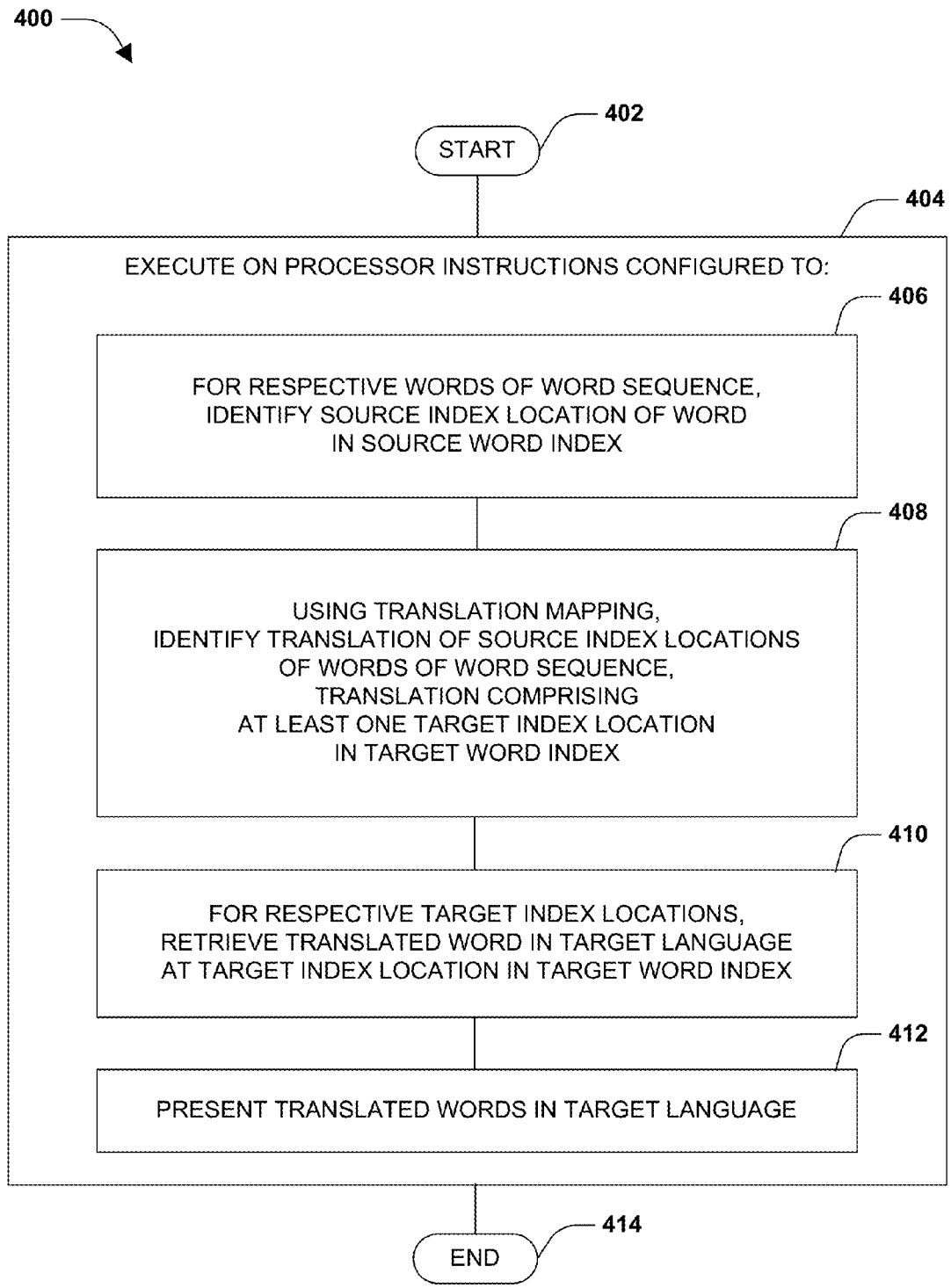
FIG. 4 is an illustration of a flow diagram depicting an exemplary method of configuring a device to use the language translation resources generated according to the techniques presented herein to provide automated language translation in a mobile, offline context.

FIG. 4 presents a second exemplary embodiment of the techniques provided herein, illustrated as an exemplary method 400 of translating a word sequence from a source language 110 to a target language 114. The exemplary method 400 may be implemented, e.g., as a set of instructions stored in a memory component of a device (e.g., a memory circuit, a platter of a hard disk drive, a solid-state storage device, or a magnetic or optical disc) having a processor and a set of language translation resources such as illustrated in the exemplary scenario 200 of FIG. 2 (i.e., a source word index 202 for the source language 110, a target word index 228 for the target language 114, and a translation mapping 218 therebetween), optionally having been generated by the exemplary method 300 of FIG. 3, where such instructions, when executed on the processor of the device, cause the device to represent the language in the memory according to the techniques presented herein. The exemplary method 400 begins at 402 and involves executing 404 the instructions on the processor. More particularly, the instructions are configured to, for respective words 108 of the word sequence 106 in the source language 110, identify 406 the source index location 208 of the word 108 in the source word index 202. The instructions are also configured to, using the translation mapping 218, identify 408 a translation 112 of the source index locations 208 of the words 18 of the word sequence 106, where the translation 112 comprises at least one target index location 208 in the target word index 228. The instructions are also configured to, for respective target index locations 208, retrieve 410 a string representation 210 of the translated word 208 in the target language 114 at the target index location 208 in the target word index 228. The instructions are also configured to present 412 the translated words 108 in the target language 114 to the user 102. In this manner, the device achieves an automated translation of the word sequence 106 from the source language 110 to a translation 112 in the target language 114 in accordance with the techniques presented herein, and so ends at 414.

Figure 5:
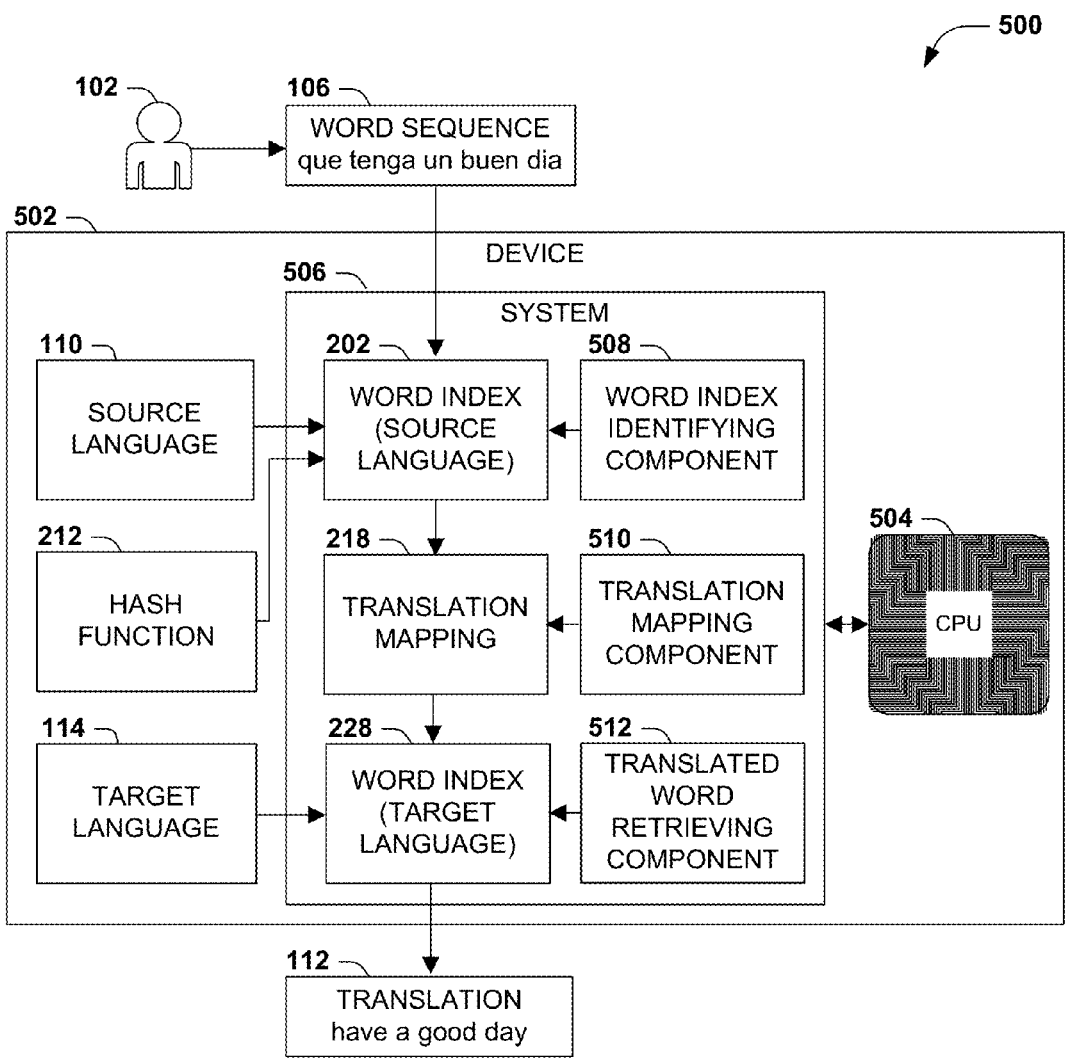
FIG. 5 is an illustration of an exemplary scenario featuring an exemplary component architecture of a device configured according to the techniques presented herein.

FIG. 5 presents a third exemplary embodiment of the techniques presented herein, illustrated as an exemplary system 506 for automatically translating a word sequence 106 from a source language 110 into a translation 112 in a target language 114. The exemplary system 506 may be implemented, e.g., as a set of instructions stored in a memory component of a device 502 (e.g., a memory circuit, a platter of a hard disk drive, a solid-state storage device, or a magnetic or optical disc) having a 504 processor and a set of language translation resources such as illustrated in the exemplary scenario 200 of FIG. 2 (i.e., a source word index 202 for the source language 110, a target word index 228 for the target language 114, and a translation mapping 218 therebetween), optionally having been generated by the exemplary method 300 of FIG. 3, where such instructions, when executed on the processor 504 of the device 502, serve as the components of an exemplary system 506 for performing automated translation. The exemplary system 506 comprises a word index identifying component 508 that is configured to, for respective words 108 of the word sequence 106, identify the source index location 208 of the word in the source word index 202. The exemplary system 506 also comprises a translation mapping component 510 that is configured to, using the translation mapping 218, identify a translation 112 of the source index locations 208 of the words 108 of the word sequence 106, where the translation 112 comprises at least one target index location 208 in the target word index 228. The exemplary system 506 also comprises a translated word retrieving component 512 that is configured to, for respective target index locations 208, retrieve a translated word 108 in the target language 114 at the target index location 208 in the target word index 228, and to present the translated words 108 in the target language 114. In this manner, the exemplary system 506 achieves the translation 112 of the word sequence 106 into the source language 110.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
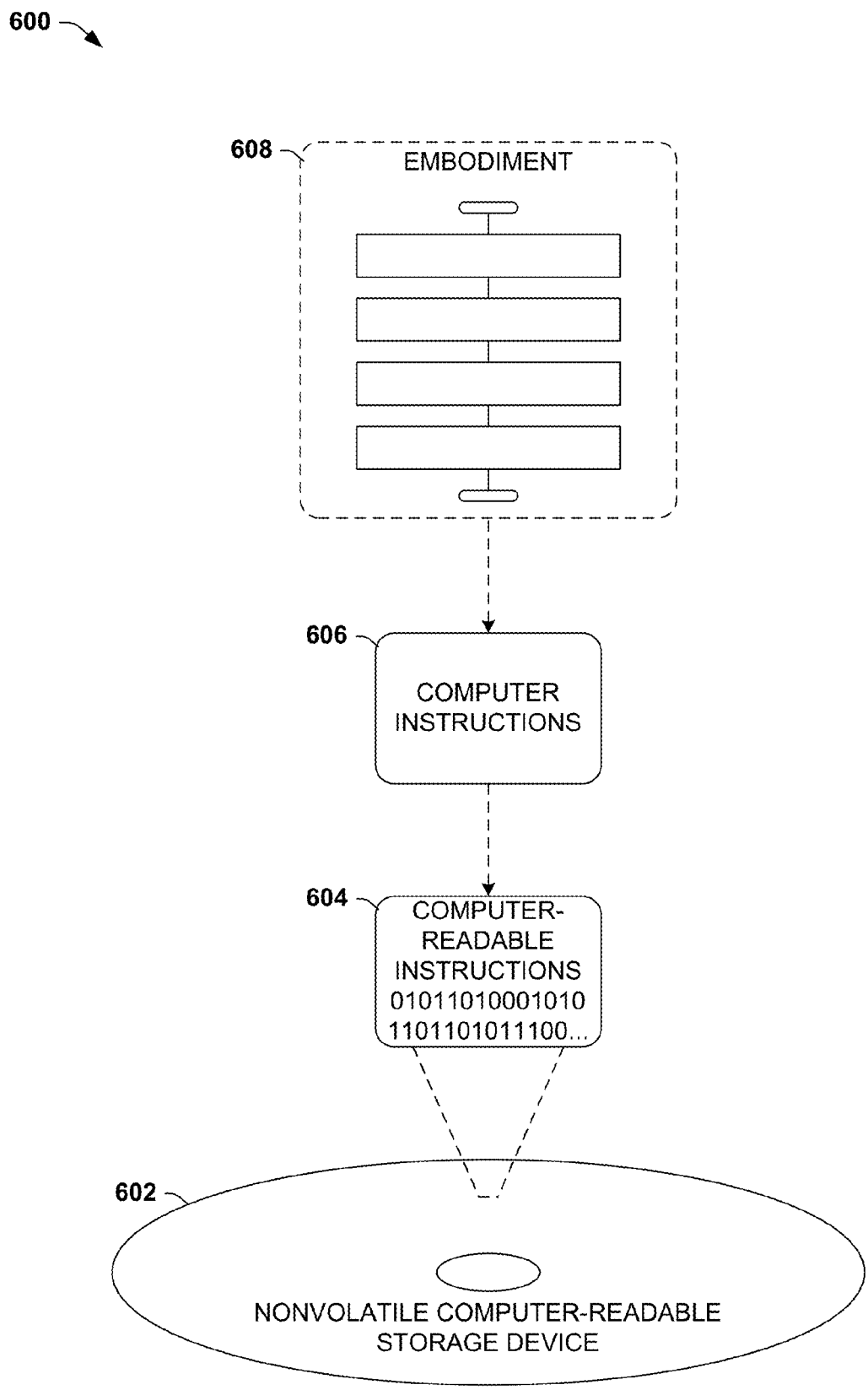
FIG. 6 is an illustration of an exemplary nonvolatile computer-readable storage device encoding executable instructions configured to cause a device to operate according to the techniques presented herein.

An exemplary computer-readable medium that may be devised in these ways is illustrated in FIG. 6, wherein the implementation 600 comprises a computer-readable storage device 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. Some embodiments of this computer-readable medium may comprise a nonvolatile computer-readable storage medium (e.g., a hard disk drive, an optical disc, or a flash memory device) that is configured to store processor-executable instructions configured in this manner. Many such computer-readable storage devices may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary methods of FIGS. 3 and 4; the exemplary system 506 of FIG. 5; and the exemplary computer-readable storage device 502 of FIG. 2 and the exemplary computing unit enclosure 202 of FIG. 3) to confer individual and/or synergistic advantages upon such embodiments.

D1. Scenarios

A first aspect that may vary among embodiments of these techniques relates to the scenarios wherein such techniques may be utilized.

As a first variation of this first aspect, these techniques may be implemented on many types of devices 104, including workstations, servers, laptop and palmtop computers, phones, tablets, cameras, personal digital assistants (PDAs), and game consoles.

As a second variation of this first aspect, these techniques may be applied to translate among many types of languages, such as a first natural language and a second natural language; a first dialect of a language and a second dialect of the language; a colloquial version of a natural language and a standardized version of the natural language; and a translation between a technical language and a natural language. Some such translations may involve a transition among the domains of a language, e.g., a transition among a language specified for a first user 102 who is familiar with the specialized language of a particular technical area to the same language specified for a second user 102 who is not familiar with the technical area. Other translations may involve a translation from a first language modality of a natural language and a second language modality of the natural language (e.g., spoken language and written language, or a translation from a handwritten text to a printed text, such as optical character recognition (OCR) translation).

As a third variation of this first aspect, these techniques may involve many types of translation mappings 218. As illustrated in FIG. 1, the translation mappings 218 may include a phrase table 118 and a language model 122. However, many other types of translation mappings 218 are available in the field of automated language translation, and may provide translation logic referring to the words 108 of the respective languages according to the index locations 208 within the word indices 202, and therefore may be compatible with the architectures and techniques presented herein. Many such variations may be devised by those of ordinary skill in the art and utilized in embodiments of the techniques presented herein.

D2. Word Index Layout

A second aspect that may vary among embodiments of these techniques relates to the layout of the word index 202. It may be appreciated that many layouts may be selected to store the string representations 210 of the words 108 at particular index locations 108 and the word mappings table 204 associating such words 108 and the index locations 108 of the string representations 210. Moreover, it may be appreciated that a particular layout may present various advantages with respect to other layouts, such as space efficiency, access efficiency, and/or flexibility (e.g., providing a partially loaded word mappings table 204 to allow the addition of entries for new words 108).

As a first variation of this second aspect, the string representations 210 of the words 108 may be encoded according to various formats, such as American Standard Code for Information Interchange (ASCII), UCS Transformation Format-8-bit (UTF-8), or Unicode. Alternatively, the string representations 210 may be stored as graphic depictions of the words 108, such as pixel-map representations of glyphs for pictogram languages. The string representations 210 may also be compressed, such as using the Standard Compression Scheme for Unicode (SCSU) technique for Unicode string encoding.

As a second variation of this second aspect, the index locations 208 of respective string representations 210 may be specified in various ways. As a first example, the index location 208 may be specified as a direct-access address within the binary representation of the word index 202, such that seeking directly to the index location 208 yields the starting position of the string representation 210 of the word 108. As a second example, the index location 208 may be specified as an offset, e.g., from the end of the end of the word mappings table 204 (such that the first stored string representation 210 may be stored at offset 0x0000), or a reverse offset from the end of the binary representation of the word index 202. As a third example, the index location 208 may represent a multiple of an address or offset; e.g., the string representations 210 may be padded to start at four-byte boundaries within the word index 202, and the index location 208 may be multiplied by four for use as an address or offset. This example may marginally increase the size of the word index 202 due to the padding, but may enable a larger number of words string representations 210 (and therefore words) to be encoded using index locations 208 of a particular size, such as two-byte index locations 208, and may therefore provide significant space savings in the translation mapping 218. As a fourth example, the word index 202 may be compressed in various ways, and the index locations 208 may be selected to identify the locations of the string representations 210 in either the compressed or the uncompressed version of the word index 202.

As a third variation of this second aspect, the word mappings 206 comprising the word mappings table 204 may be specified in various ways, such as a sorted or unsorted array, a binary tree, or a table. Various representations may provide advantages in terms of speed of generation, space efficiency, and access efficiency. In some scenarios, it may be advantageous to provide a bucket-list hashtable representation, wherein respective words 108 may be indexed according to the hash value 214 of the string representation 210 of the word 108 computed using a hash function 212, and where a collision among two or more words 108 may be resolved by storing all of the words 108 in an array that may be examined linearly to identify the entry for the selected word 108, or in a second hashtable generated by indexing the words 108 according to a second hash function 212. Additionally, the word mappings table 204 may include additional information about respective words 108, such as the probability that a particular word 108 or word phrase in the source language 110 maps to a particular translation 112 in the target language 114. Such mapping probabilities may be stored, e.g., in the word mappings 206 of the word mappings table 204, and/or in the translation mappings 218 (e.g., in the target language model 122).

As a fourth variation of this second aspect, the target word index 228 may include or omit a word mappings table 204. It may be appreciated that if translation is only desired from the source language 110 to the target language 114, then the target word index 228 may only be accessed in order to extract the string representations 210 of the target index locations 224 specified by the translation mapping 218, and the word mappings table 204 of the word index 228 may be unused. Accordingly, the word mappings table 204 of the target word index 228 may be omitted in furtherance of space efficiency, and/or the translation mapping 218 may provide unidirectional associations 220 between the word index sequences 222 and the translated words 224. Conversely, if bidirectional translation is desirable, the target word index 228 may also include a word mappings table 204 in order to provide translation from the target language 114 back into the source language 110.

As a fifth variation of this second aspect, the string representations 210 of respective words 108 of the source word index 202 and/or the target word index 208 may include a word header that provides information about the string representation 210 of the word 108. For example, respective word headers may specify the word size (e.g., string length) of the string representation 210 of the word 108, which may facilitate access through a fixed-length read and/or reduce the size of the word index 202 by enabling a removal of string-terminating null characters.

As a sixth variation of this second aspect, the word mappings table 204 may also include a word index header 702 that provides various information about the word mappings table 204 and/or the word index 202, such as a version indicator of the word index 202; the number of words 108 represented in the word index 202; the size of the word mappings table 204; the identification of a hash function 212 used to index the words 108 in the word mappings 206; and/or the identification of a compression algorithm used to compress the word index 202.

Figure 7:
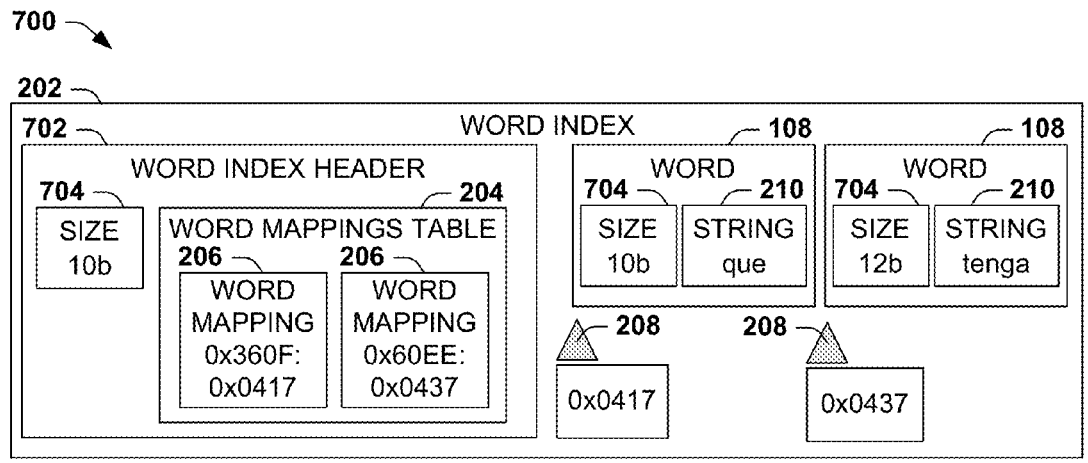
FIG. 7 is an illustration of an exemplary scenario featuring an exemplary layout of a word index.

FIG. 7 presents an illustration of an exemplary scenario 700 featuring an exemplary layout of a word index 202 incorporating several such variations. In this exemplary scenario 700, a word index 202 is provided that begins with a word index header 702 providing various information about the word index 202, including the word index header size 702 of the word index header 702 (including the word mappings table 204), which may be added to each index location 208 (specified as an offset from the end of the word index header 702) to identify the direct-access address of respective words 108 in the word index 202. Additionally, the words 108 stored in the word index 202 include a word header indicating the word size 704 (e.g., the string length) of the string representation 210 of the word 108, and, directly following the word size 704, the string representation 210 of the word 108. For respective words 108 identified by the translation mappings 218 as an index location 208, the device may retrieve the string representation 210 by reading the word size 704 from the word header at the index location 208 (optionally first adding the word index header size 704 to the index location 208 if such index locations 208 are specified as an offset from the end of the word index header 702), and then, following the word size 704, reading the string representation 210 stored following the word size 704 and of the length specified by the word size 704. In this manner, the layout of the word index 202 may be selected in various ways by those of ordinary skill in the art while implementing the techniques presented herein.

D3. Mapping Probabilities

A third aspect that may vary among embodiments of these techniques relates to computing and storing with the translation resources a set of mapping probabilities, each indicating the likelihood that a particular translation 112 in the target language 114 accurately and fluently represents the word sequence 106 in the source language 110. This information may be stored, e.g., in the translation mappings 218, and may be used by the language model 122 to choose translations 112 of word sequences 106 provided by the user 102. Accordingly, the device 104 may, for respective translation mappings 218, identify a mapping probability of the word sequence 106 to the translation 112, and store the mapping probability of the word sequence 106 in the target language model 122 and/or the phrase table 118. Also, when generating a translation 112 of a word sequence 106, the device 104 may select one or more translations 112 having the highest mapping probability among the candidate translations 120 for the word sequence 106.

As a further variation of this third aspect, it may be advantageous to store and use integers to identify the mapping probabilities, as integers may be compared faster and more efficiently than floating-point values. In particular, the mapping probability integers may be selected to evenly distribute the range of mapping probability floating-point values, thus enhancing the significance of the range of values in the floating-point integer. For example, a one-byte unsigned integer may represent 256 possible floating-point probabilities, and it may be desirable to associate respective integer values with a floating-point probability represented by a significant range of the candidate translations 120.

Accordingly, while generating the translation resources, the device 104 may translate a mapping probability floating point for a translation 120 into a mapping probability integer, and include the mapping probability integer of the translation 120 in the language model 122. In addition, the device 104 may include a mapping probability table that identifies the mapping probability floating point value for the respective mapping probability integers (e.g., an integer of "20" may be mapped to a floating-point value of 0.2496). In particular, this selection may cluster the mapping probability floating points into mapping probability clusters, and, for respective clusters, select the mapping probability integer for the word sequences 106 mapped into the target language model 122. Conversely, while using the target language model 122, the device 104 may use the mapping probability table to translating the mapping probability integer for the translation into a mapping probability floating point, which may be used by the target language model 122 to choose the translation 112 from the candidate translations 120. Those of ordinary skill in the art may devise many techniques for storing, accessing, and applying mapping probabilities while implementing the techniques presented herein.

D4. Caching

A fourth aspect that may vary among embodiments of these techniques relates to the provision of one or more caches to facilitate access to the language translation resources.

As a first variation of this fourth aspect, a word index cache may be provided in order to enable faster access to portions of the word index 202. For example, the word index 202 may be conceptually divided into chunks, each comprising a section of the word index 202 that may be stored in the word index cache. The device 104 may generate the word index cache by reserving a memory region to store recently accessed chunks of the word index 202. Upon accessing a word 108 at an index location 208 in the word index 202, the device may determine whether the index location 208 is within a chunk stored in the word index cache. If so, the device 104 may access the index location 208 within the chunk in the word index cache; and if not, the device 104 may read the requested chunk of the word index 202 including the index location 208 and store the chunk in the word index cache (optionally replacing a previously stored chunk that has been least recently used).

Figure 8:
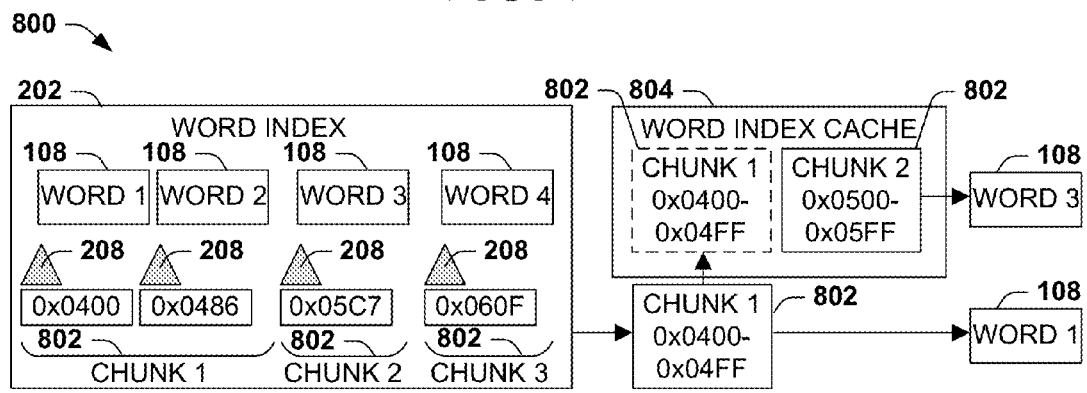
FIG. 8 is an illustration of an exemplary scenario featuring a provision of a word index cache to provide cached access to a word index.

FIG. 8 presents an illustration of an exemplary scenario 800 featuring this access pattern, wherein a word index 202 stored on a storage device is divided into chunks 802, each spanning a particular address range within the word index 202. A word index cache 804 may be generated in memory that stores a small number of chunks 802 in a faster region of memory (e.g., a system memory circuit that provides higher throughput than a storage component of the device 104). When the device 104 requests the third word 108, the device 104 may determine that the index location 208 of the third word 108 is associated with the second chunk 802, and may retrieve the string representation 210 of the word 108 from the chunk 802 stored in the word index cache 804. However, when a request is received for the first word 108, the device 104 may determine that the chunk 802 comprising the index location 208 of the first word 108 is not stored in the word index cache 804. The device 104 may therefore retrieve the associated chunk 802 from the word index 202 and store it in the word index cache 804, in addition to accessing the first word 108 from the chunk 802. In this manner, the word index cache 804 may provide more rapid access to words 108 that have recently been used than uncached access techniques that retrieve each word 108 from the word index 202.

As a second variation of this fourth aspect, the other language translation resources (e.g., the phrase table 118 and/or the target language model 120) may also include a cache. Additionally, such caches may be configured, e.g., according to the access patterns of each language translation resource. As a first example, if one resource is frequently accessed in a linear manner, a predictive cache may be provided that is configured to retrieve and store chunks 802 that follow a recently accessed chunk 802, thus buffering the next data in the linear access pattern. Alternatively, if the access pattern of the language translation resource is typically random, the cache may utilize a recently-used cache that stores the most recently accessed chunks 802. Additionally, various properties of the cache may be selected in view of the properties of the device 104 (e.g., the size of the cache and the allocation of chunks 802 may be selected based on the available memory capacity of the device 104). Conversely, the layout of the language translation resources may be selected in view of the presence and types of caching (e.g., a word index cache 804 may be generated such that words 108 that are often used together are stored within the same chunk 802). These and other caching techniques may be utilized in embodiments of the techniques presented herein.

D5. Language Stores and Language Packs

A fifth aspect that may vary among embodiments of these techniques relates to the use of language stores to provide language translation resources to the device 104 in order to support translations among various languages. The language store may be accessible to the device 104 remotely (e.g., over a network) or locally (e.g., stored upon another computer or device of the user 102), and may store a set of language packs that provide language translation resources (e.g., word indices 202, phrase tables 118, and/or target language models 120) for various languages. The device 104 may connect to the language store and request a particular language pack, and, upon receiving such a language pack, may store it in the memory (optionally replacing another language pack that is no longer in use). As one such variation, this technique may be used to provide a modular approach to language translation, wherein a language may be partitioned into language domains for different subsets of the language (e.g., vocabulary and phrases for particular topics). Upon identifying an occasion to translate words 108 in a particular language domain that is not yet supported (e.g., for a present translation 112, or for imminent future translations 112), the device 104 may request the corresponding language pack from the language store, may store the language pack in the storage upon receipt, and may access the language pack to translate the words 108 associated with the language domain represented thereby.

Figure 9:
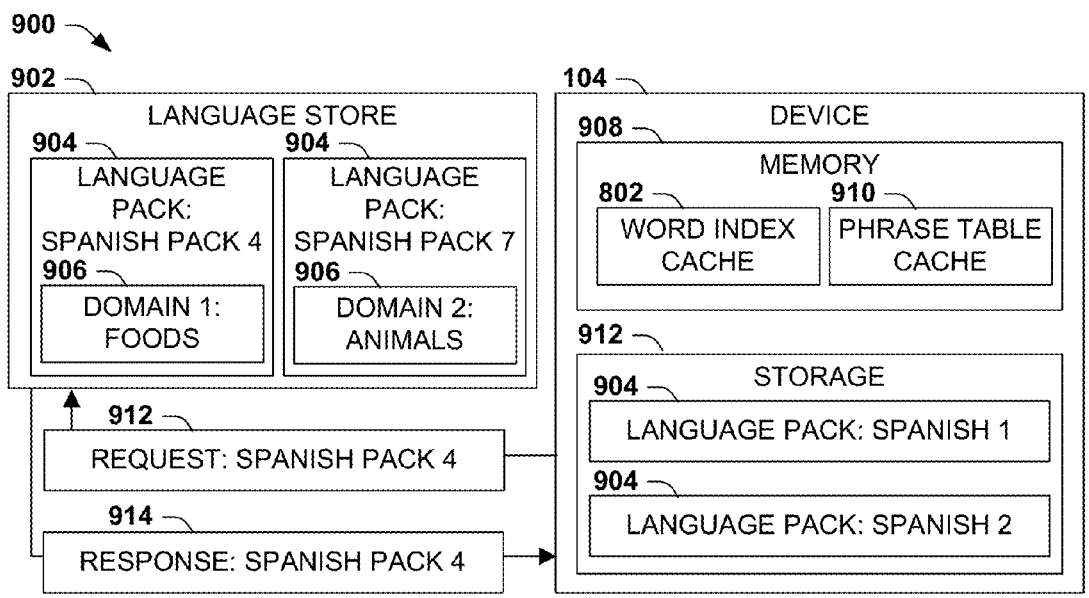
FIG. 9 is an illustration of an exemplary scenario featuring a language store configured to supply devices with language packs for automated translation.

FIG. 9 presents an illustration of an exemplary scenario 900 featuring a device 104 having access to a language store 902 that stores a set of language packs 904 and featuring a few variations of the techniques provided herein. In this exemplary scenario 900, respective language packs 904 are associated with a language domain 906, e.g., specialized words 108 in the Spanish language for types of food or animals. The device 104 may comprise a memory component 908 storing a word index cache 802 and a phrase table cache 910, and also a storage component 912 storing a set of language packs 904 for translating respective language domains 904 of a language. Upon determining an occasion to translate portions of the language that are not contained in any of the language packs 904 stored in the storage component 912, the device 104 may contact the language store 902 with a request 912 to transmit the language pack 904 (e.g., requesting the language pack 904 by reference number, or simply presenting to the language store 902 the words 108 of the language that are not yet translatable). The language store 902 may identify the requested language pack 904 and may provide a response 914 including the language pack 904, which the device 104 may store in the storage component 912. In this manner, the device 104 and language store 902 may interoperate to provide an extensible language translation model. Those of ordinary skill in the art may devise many such features that may be implemented in embodiments of the techniques presented herein.

E. Computing Environment

Figure 10:
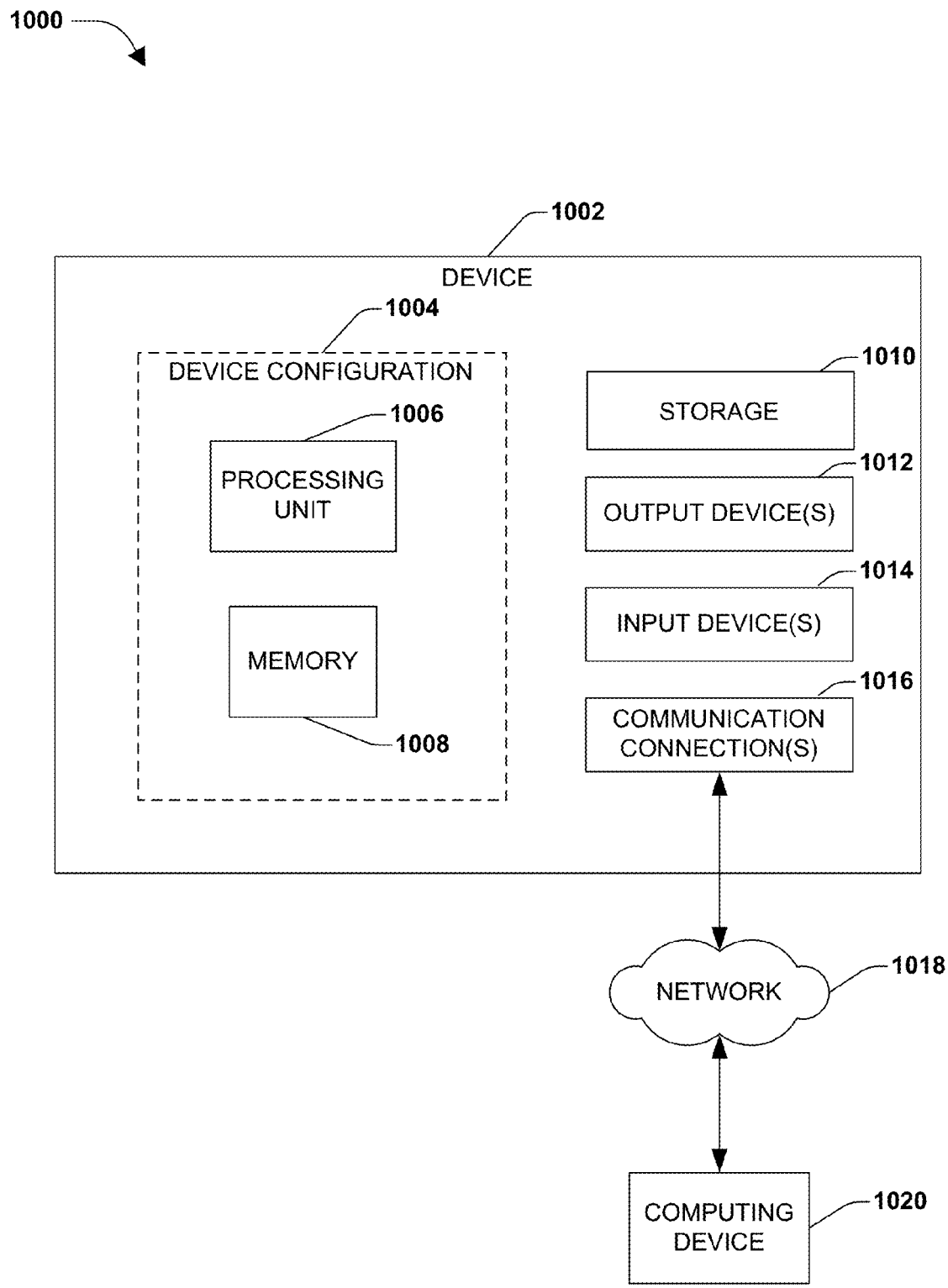
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of translating a word sequence from a source language to a target language on a device having a processor and a memory comprising a source word index for the source language, a target word index for the target language, and a translation mapping, the method comprising:
    executing on the processor instructions configured to:
        store in the memory a word index comprising, for respective words of the language:
            the word stored at an index location in the word index, and
            a word mapping that identifies the index location of the word in the word index;
        store in the memory a translation mapping identifying, for a word index sequence comprising at least one index location, the translation of the words respectively located at the index locations of the word index;
        for respective words of the word sequence, identify the source index location of the word in the source word index;
        using the translation mapping, identify a translation of the source index locations of the words of the word sequence, the translation comprising at least one target index location in the target word index;
        for respective target index locations, retrieve a translated word in the target language at the target index location in the target word index; and
        present the translated words in the target language.

2. The method of claim 1:
    the translation mapping comprising:
        a phrase table mapping respective word sequences in the source language to at least one candidate translation in the target language, and
        a translation model identifying, for respective candidate translations, a mapping probability of the candidate translation in the target language; and
    identifying the translation comprising:
        using the phrase table, mapping the words of the word sequence into at least one candidate translations; and
        using the translation model, selecting among the at least one candidate translation a translation in the target language.

3. The method of claim 2:
    the translation model identifying, for respective word sequences, a mapping probability of the word sequence to the translation; and
    selecting among the at least one candidate translation comprising: selecting the candidate translation having a highest mapping probability among the candidate translations.

4. The method of claim 3:
the instructions further configured to store in the translation model a mapping probability table identifying, for respective translations, a mapping probability integer; and
selecting the candidate translation comprising:
reading from the translation model a mapping probability integer;
using the mapping probability table, translating, for the translation, the mapping probability integer into a mapping probability floating point; and
identifying the mapping probability of the translation in the translation model using the mapping probability floating point.

5. The method of claim 1:
the device comprising a word mapping function configured to, for respective words in the source language, identify a word mapping value;
the source word index comprising a word mapping index identifying, for respective word mapping values, the source index location of the word in the source word index; and
identifying the source index location of the word in the source word index comprising:
using the word mapping function, identifying the word mapping value of the word; and
using the source word index, identifying the source index location of the word in the source word index.

6. The method of claim 1:
the target word index storing at the target index location a word header comprising:
a word size of a string representation of the translated word stored at the target index location, and
following the word size, the string representation; and
retrieving the translated word from the target word index comprising:
reading from the word header, at the target index location, the word size; and
following the word size, reading the string representation of the word size for the translated word.

7. The method of claim 1, comprising:
generating a word index cache storing at least one chunk of a word index; and
the instructions further configured to:
upon accessing an index location in the word index:
determine whether the index location is within a chunk stored in the word index cache;
upon determining that the index location is within a chunk stored in the word index cache, access the index location in the chunk in the word index cache; and
upon determining that the index location is not within a chunk stored in the word index cache:
read a chunk of the word index including the index location;
access the index location in the chunk; and
store the chunk in the word index cache.

8. The method of claim 1, comprising:
generating a translation mapping cache storing at least one chunk of the translation mapping; and
the instructions further configured to:
upon accessing a word sequence in the translation index:
determine whether the word sequence is within a chunk stored in the translation mapping cache;
upon determining that the word sequence is within a chunk stored in the translation mapping cache, access the word sequence in the chunk in the translation mapping cache; and
upon determining that the word sequence is not within a chunk stored in the translation mapping cache:
read a chunk of the translation mapping including the word sequence;
access the word sequence in the translation mapping; and
store the chunk in the translation mapping cache.

9. The method of claim 1:
the device having access to a language store comprising, for respective selected languages, a language pack comprising a word index and a translation mapping for the selected language; and
the instructions further configured to, upon receiving a selection of a selected language:
request the selected language from the language store; and
upon receiving the language pack from the language store, store the language pack for the selected language in the memory.

10. The method of claim 9:
the language store comprising, for at least one selected language, at least two language packs respectively representing a language domain of the selected language; and
the instructions further configured to, upon receiving a selection of a target language domain for a selected language having a source language domain stored in the memory of the device:
request the target language domain for the selected language from the language store; and
upon receiving the language pack for the target language domain from the language store, store the language pack for the target language domain of the selected language in the memory.

11. A system for translating word sequences in a source language to translations in a target language, the system comprising:
a processor; and
a memory storing:
a word index comprising, for respective words of the language:
the word stored at an index location in the word index, and
a word mapping that identifies the index location of the word in the word index;
a translation mapping identifying, for a word index sequence comprising at least two word indices, the translation of the words of the word sequence mapping to the respective index locations of the words of the word index sequence; and
instructions that, when executed by the processor, provide a translator that, upon receiving a word sequence in the source language to be translated into the target language:
for respective words of the word sequence, identifies the source index location of the word in the source word index;
using the translation mapping, identifies a translation of the source index locations of the words of the word sequence, the translation comprising at least one target index location in the target word index;
for respective target index locations, retrieves a translated word in the target language at the target index location in the target word index; and
presents the translated words in the target language.

12. The system of claim 11, wherein the translation mapping includes:
- a phrase table mapping respective word sequences to a word sequence in the language; and
- a target language model mapping respective word sequences to a translation in a language.

13. The system of claim 12, wherein the instructions are further configured to, for respective word sequences:
- identify a mapping probability of the word sequence to the translation; and
- store the mapping probability of the word sequence in the target language model.

14. The system of claim 13, wherein:
- the instructions are further configured to store in the target language model a mapping probability table identifying, for respective mapping probability integers, a mapping probability floating point; and
- identifying the mapping probability includes:
  - using the mapping probability table, translating, for the translation of the word sequence, the mapping probability floating point into a mapping probability integer; and
  - including the mapping probability integer of the translation in the target language model.

15. The system of claim 14, wherein the instructions are further configured to:
- cluster the mapping probability floating points into mapping probability clusters; and
- for respective clusters, select the mapping probability integer for the word sequences mapped into the target language model.

16. The system of claim 11, wherein the translation language is selected from a language translation set comprising:
- a translation between a first natural language and a second natural language;
- a translation between a first dialect of a language and a second dialect of the language;
- a translation between a first language modality of a natural language and a second language modality of the natural language;
- a translation between a colloquial version of a natural language and a standardized version of the natural language; and
- a translation between a technical language and a natural language.

17. The system of claim 11 wherein:
- the device includes a word mapping function configured to, for respective words, identify a word mapping value; and
- storing the word mapping of the word index includes:
  - for respective words, using the word mapping function, compute the word mapping value; and
  - store the word mapping as an association of the word mapping function and the word mapping location.

18. The system of claim 11, wherein:
- the language comprising at least two language domains respectively comprising a subset of the words of the language;
- storing the word index comprising: for respective language domains, storing on the device a word index for the words of the language domain of the language; and
- storing the translation mapping comprising: for respective language domains, storing on the device translation mapping for the words of the language domain of the language.

19. The system of claim 11, wherein the index location includes at the index location for the word:
- a word size of a string representation of the word stored at the index location; and
- following the word size, the string representation.

20. A method of translating a word sequence from a source language to a target language, via a device having a processor and a memory comprising a source word index for the source language, a target word index for the target language, and a translation mapping, the method comprising:
- executing on the processor instructions configured to:
  - for respective words of the word sequence, identify the source index location of the word in the source word index;
  - using the translation mapping, identify a translation of the source index locations of the words of the word sequence, the translation comprising at least one target index location in the target word index;
  - for respective target index locations, retrieve a translated word in the target language at the target index location in the target word index;
  - present the translated words in the target language;
  - accessing a language store comprising, for respective selected languages, a language pack comprising a word index and a translation mapping for the selected language; and
  - upon receiving a selection of a selected language:
    - request the selected language from the language store; and
    - upon receiving the language pack from the language store, store the language pack for the selected language in the memory.

* * * * *